H. H. WAINWRIGHT.

Gas Apparatus.

No. 135,455.  Patented Feb. 4, 1873.

Witnesses.  Henry H. Wainwright
  by his Atty
  Howson and Son

AM. PHOTO-LITHOGRAPHIC CO. N.Y. (OSBORNE'S PROCESS.)

UNITED STATES PATENT OFFICE.

HENRY H. WAINWRIGHT, OF PHILADELPHIA, PENNSYLVANIA.

IMPROVEMENT IN GAS APPARATUS.

Specification forming part of Letters Patent No. 135,455, dated February 4, 1873.

*To all whom it may concern:*

Be it known that I, HENRY H. WAINWRIGHT, of the city and county of Philadelphia, State of Pennsylvania, have invented an Improved Gas Apparatus, of which the following is a specification:

The object of my invention is an apparatus in which hydrogen or carbureted-hydrogen gas can be generated automatically as it is required for use, and maintained at a uniform pressure, and in which the spent dilute acid used in the generation of the hydrogen can be evaporated, for the purpose of crystallizing and recovering the sulphate of iron held in solution in the same.

Figure 1:
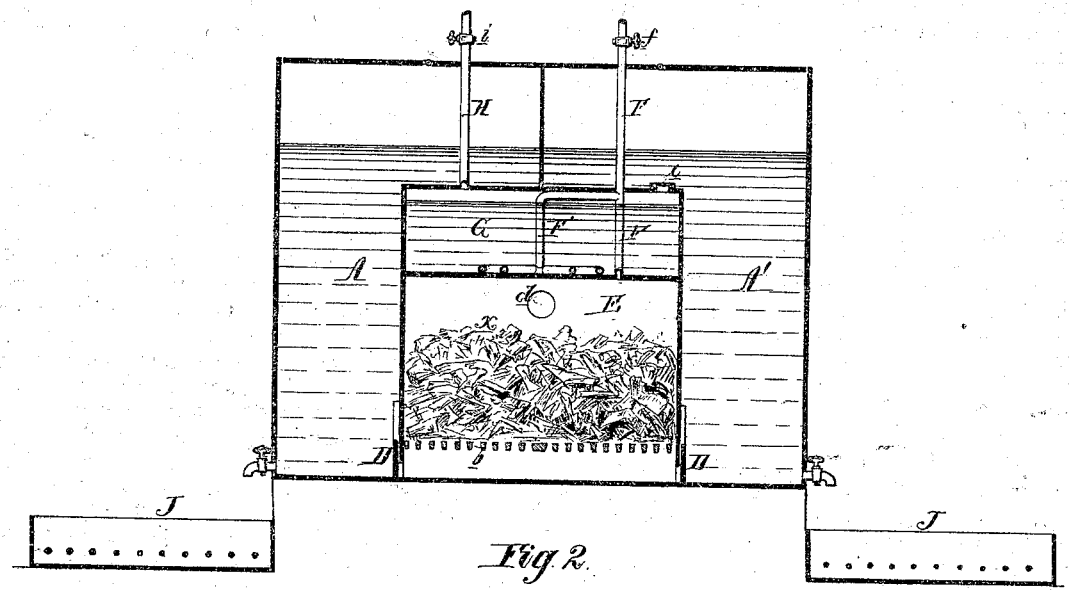

These ends I attain by the use of the apparatus illustrated in the vertical section, Fig. 1, in which A and A' represent two chambers containing dilute sulphuric acid, and each communicating at the bottom, through openings closed by valves D, with a chamber, E, upon a sieve or grating, $b$, in which, slightly above the valves, rests a mass of scrap metal, $x$. The action of the dilute acid from either or both of the chambers upon the scrap metal generates hydrogen, which passes through a pipe, F, and through a branch, F', of the same into a chamber, G, containing liquid hydrocarbon, the gas in bubbling up through the latter becoming carbureted, and passing off through a pipe, H. The spent dilute acid from the chambers A and A' holds sulphate of iron (copperas) in solution, and is drawn off from time to time into pans J, and there evaporated in order to recover the sulphate by crystallization.

In order that my invention may be fully understood, I will now proceed to describe the detailed construction and operation of the apparatus, and the method of charging the several chambers.

Figure 2:
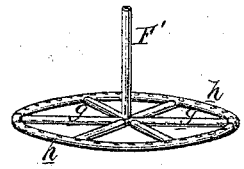

The cap covering the opening $d$ in the side of the chamber E is first removed, and the metal scrap introduced through the said opening onto the grating $b$. The cap is then replaced, and the valves D D closed, after which the carbureting material is introduced into the chamber G through an opening covered by the screw-cap $e$, the chambers A and A' being next filled or partially filled with dilute sulphuric acid. The apparatus having been thus charged, one of the valves—the valve D, for instance—of the chamber A is raised, and the cock $f$ in the pipe F opened, which will permit the air to escape from the chamber E and the acid-water from the chamber A to rise in the latter through the grating $b$ and into and among the scrap metal $x$. As soon as this has been accomplished the cock $f$ is closed, in order that the hydrogen gas generated in the chamber E may be caused to pass through the pipes F and F' into the chamber G. The gas does not pass in a single volume into the latter, but is thoroughly diffused in the same by means of an arrangement of radial arms, $g$, and a circular perforated pipe, $h$, communicating therewith, with which the pipe F is furnished at its lower end. (See Fig. 2.) After rising through the body of hydrocarbon in the chamber G, the carbureted gas passes through the pipe H to the burners, to be used for either heating or illuminating purposes. When the cock $i$ is closed, or the lights turned off, the gas will continue to generate in the chamber E, and will gradually, as its volume increases, force the dilute acid downward to a point beneath the grating $b$ and back into the chamber A. The acid being thus removed from contact with the metal scrap, generation of gas will instantly cease until the burners are again opened. When the dilute acid in the vessel A becomes weakened, its valve D is closed and the valve of the vessel A' opened, which will permit the stronger acid from the latter to flow into the generating-chamber, and the operation to be therefore continued uninterruptedly. The weakened acid can then be drawn off from the chamber A into the evaporating-tank J, in order to recover the sulphate of iron from the same, as before mentioned, and after having been thus emptied the said chamber can again be filled with dilute acid to be held in reserve until needed.

The carbureter, consisting of the chamber G with its pipes, can be used for carbureting air or coal gas as well as hydrogen, and may either be arranged within the apparatus, as described, or at some little distance from the same, the connection in the latter case being made by means of pipes.

The slide-valves D can be arranged to move either vertically or horizontally, and may be operated by means of rods extending to the outside of the apparatus.

I claim as my invention—

1. A gas apparatus in which two acid-chambers, A and A', are combined with a single generating-chamber, E, containing a quantity of metal scrap, all substantially as and for the purpose specified.

2. The shelf or grating $b$ arranged within the generating-chamber in respect to the openings provided with valves, and leading to the acid-chamber or chambers, substantially as herein described.

3. The combination, with the generating and acid chambers, of slide-valves D, for the purpose specified.

4. The combination, substantially as described, with the chambers E and G, of the air-pipe F and gas-pipe F' communicating therewith.

5. The combination with the carbureting-chamber of the pipe F', radial arms $g$, and hollow ring $h$, all substantially as specified.

6. The combination, with each acid-chamber, of an evaporating vat or vats, J, for the purpose specified.

In testimony whereof I have signed my name to this specification in the presence of two subscribing witnesses.

H. H. WAINWRIGHT.

Witnesses:
WM. A. STEEL,
HARRY W. DOUTY.